H. PRIES, DEC'D.
A. PRIES, EXECUTRIX.
BRAKE SHAFT.
APPLICATION FILED OCT. 31, 1913.
1,172,904. Patented Feb. 22, 1916.
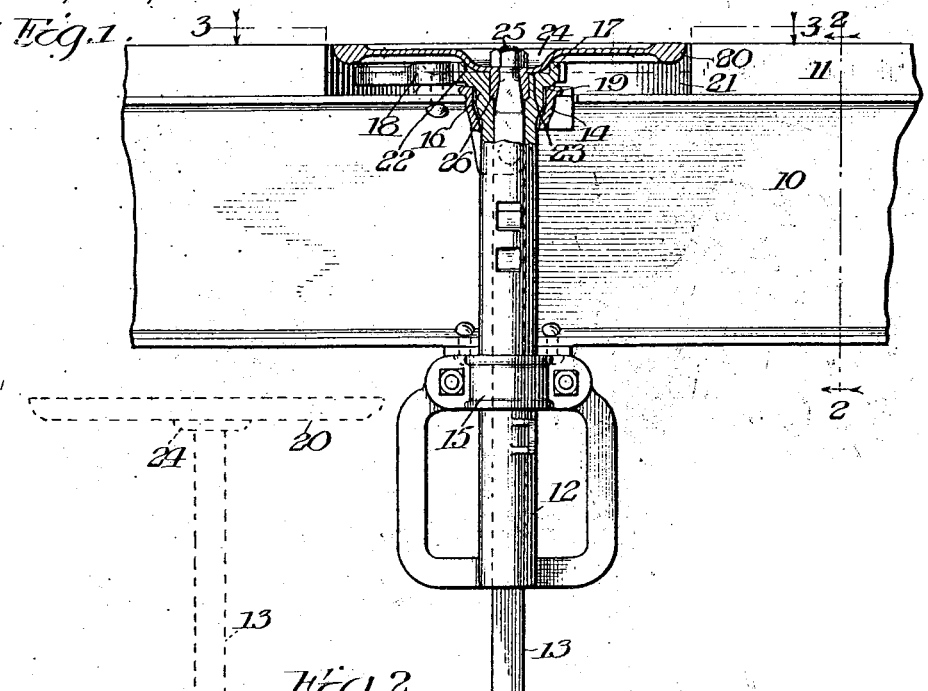
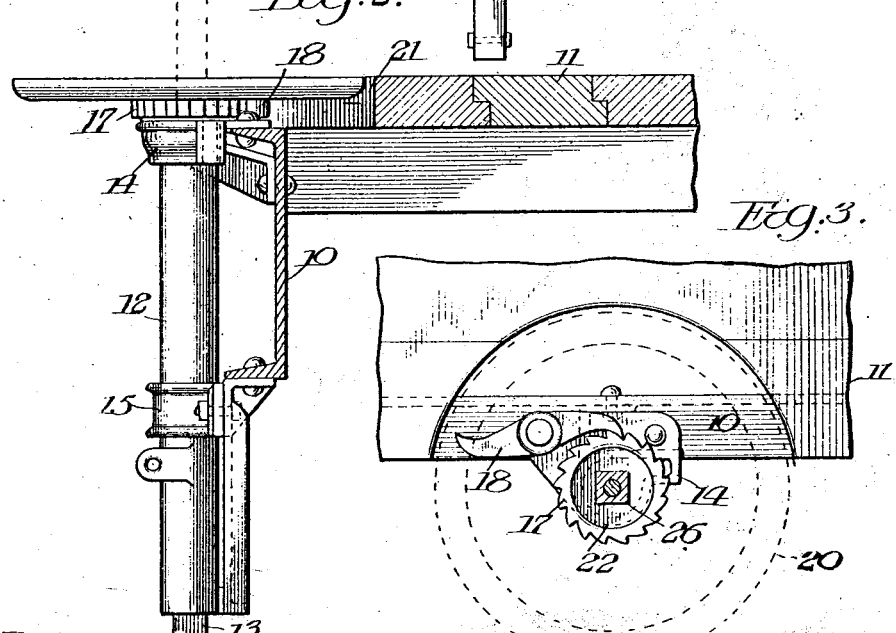
Witnesses
C. M. Wunnich
E. M. Hatcher
Inventor
Herman Pries
by Gillson & Gillson
Attys

UNITED STATES PATENT OFFICE.

HERMAN PRIES, OF MICHIGAN CITY, INDIANA; AMELIA PRIES EXECUTRIX OF SAID HERMAN PRIES, DECEASED.

BRAKE-SHAFT.

1,172,904.      Specification of Letters Patent.      Patented Feb. 22, 1916.

Application filed October 31, 1913. Serial No. 798,455.

*To all whom it may concern:*

Be it known that I, HERMAN PRIES, a citizen of the United States, and resident of Michigan City, county of Laporte, and State of Indiana, have invented certain new and useful Improvements in Brake-Shafts, of which the following is a specification, and which are illustrated in the accompanying drawings, forming a part thereof.

The invention relates to brake shafts for freight cars, of the telescopic type.

The object of the present invention is to provide a construction whereby the hand wheel and all of the appurtenances of the shaft may drop to or below the level of the upper surface of the floor of the car.

It has long been the practice in unloading gravel cars to use a plow which will travel the entire length of the train, the plow being attached to the engine by a cable, the brakes being set on all of the cars and the engine being detached from the train. This practice can be followed only when the brake mechanism is so disposed that it will not obstruct the movement of the plow.

The invention is disclosed in the accompanying drawings, in which—

Figure 1 is a detail end view of a car with the improved brake shaft applied thereto and being shown partially in section; Fig. 2 is a detail section on the line 2—2 of Fig. 1, and Fig. 3 is a detail plan section on the line 3—3 of Fig. 1.

The end sill of a car is represented at 10 and the floor at 11.

The brake shaft comprises the two sections 12, 13, in telescopic relation, the former being journaled in the brackets 14, 15, attached to the sill 10, and the latter being squared and slidably fitting within a complementary aperture in the outer member, all of which is more fully explained in my Patent No. 1,137,082, dated April 27, 1915.

The upper end of the shaft member 12, is enlarged to form a hub, 16, upon which is formed, preferably integrally, as shown, the usual ratchet wheel, 17, which coöperates with the latch or pawl 18 for holding the brake in set position. The hub, 16, is provided with a shoulder, as shown at 19, for bearing upon the upper face of the bracket 14. The upper face of this bracket is located approximately on the level with the upper face of the sill, 10, in order to permit the hand wheel, 20, of the brake, which is attached to the brake shaft member, 13, to entirely enter a recess 21, formed in the floor, 11, of the car for its reception.

The ratchet wheel, 17, is recessed in its upper face, as shown at 22, to receive the lateral offset hub portion 23, of the hand wheel 20. By offsetting the hub of the hand wheel, a downwardly extending recess 24 is provided for the reception of the projecting upper end of the shaft member 13, and a nut 25 applied thereto for securing it to the hand wheel so that neither the rim of the wheel nor the upper end of the brake shaft, will project above the upper face of the car floor when the shaft is not in use.

The hub of the hand wheel is provided with a laterally extending flange hub or sleeve 26, projecting downwardly for the purpose of insuring adequate strength, the hub, 16, at the upper end of the shaft section, 12, being counter-bored for its reception. In order to provide ample stock to secure adequate strength of the hub, 16, the latter is made substantially tapering in form as shown, and the bracket 14 within which it is journaled is correspondingly shaped.

I claim as my invention,—

1. In brake mechanism, a pair of relatively non-rotatable telescoping shafts, a ratchet wheel on the outer shaft, a pawl coöperating with the ratchet wheel, a bracket for supporting the outer shaft, means for preventing vertical movement of the ratchet wheel with reference to the bracket, and a hand wheel attached to the inner shaft and adapted to seat in and be supported by the ratchet wheel.

2. In a brake shaft, in combination, a pair of telescoping shaft members, the outer member having a tapering counter-bored hub at its upper end, a bracket within which such hub is journaled and having a tapering socket, a hand wheel fixed upon the upper end of the inner shaft member, the hub of the wheel having a downwardly extending sleeve fitting within the counterbore of the hub of the outer shaft member.

3. In a brake shaft, in combination, a pair of telescoping shaft members, the outer member having on its upper end a ratchet wheel provided with a recess in its upper face, a pawl coöperating with the ratchet wheel, and a hand wheel attached to the upper end of the inner shaft member and having a downwardly offset recessed portion adapted to enter the recess in the ratchet wheel.

3. In a brake shaft, in combination, a pair of telescoping shaft members, the outer member having the upper end of its bore enlarged, a hand wheel attached to the upper end of the inner shaft member, the hub of the hand wheel being depressed and having a downwardly extending flange adapted to enter the bore of the outer shaft member, the depressed portion of the hand wheel surrounding the upper end of the inner shaft member.

4. In a brake shaft, in combination, a pair of shaft members, one thereof being tubular and telescopically receiving the other shaft member within its bore, and a hand wheel having its hub extending at one side only of the plane of the rim of the wheel, such hub being mounted upon the inner one of the two shaft members and loosely entering the bore of the outer shaft member.

6. In hand brake mechanism, a bracket having mounted thereon a ratchet wheel, said ratchet wheel having a recess therein, and a brake wheel having a hub adapted, when the brake shaft is in lowermost position, to seat in the recess in said ratchet wheel.

7. In hand brake mechanism, a bracket mounted upon the end sill of a car, and below the floor level thereof, a brake shaft and pawl and ratchet mechanism mounted on said bracket, the brake shaft being positioned in said ratchet wheel, and adapted for vertical endwise movement, and a brake wheel secured upon said shaft, the said brake wheel being adapted to be lowered below the level of the car floor and to seat in and be supported by said ratchet wheel.

HERMAN PRIES.

Witnesses:
JNO. W. CARLSON,
WILFORD C. ROBINSON.